US009592789B2

(12) United States Patent
Fujiwara

(10) Patent No.: US 9,592,789 B2
(45) Date of Patent: Mar. 14, 2017

(54) SIDE AIRBAG DEPLOYMENT DIRECTION CONTROL STRUCTURE

(71) Applicant: TOYOTA JIDOSHA KABUSHIKI KAISHA, Toyota-shi, Aichi-ken (JP)

(72) Inventor: Yusuke Fujiwara, Okazaki (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 17 days.

(21) Appl. No.: 14/412,321

(22) PCT Filed: Jun. 13, 2013

(86) PCT No.: PCT/JP2013/066398
§ 371 (c)(1),
(2) Date: Dec. 31, 2014

(87) PCT Pub. No.: WO2014/017211
PCT Pub. Date: Jan. 30, 2014

(65) Prior Publication Data
US 2015/0151711 A1 Jun. 4, 2015

(30) Foreign Application Priority Data
Jul. 25, 2012 (JP) ................................. 2012-164918

(51) Int. Cl.
*B60R 21/2342* (2011.01)
*B60R 21/207* (2006.01)
(Continued)

(52) U.S. Cl.
CPC ........ *B60R 21/2342* (2013.01); *B60R 21/207* (2013.01); *B60R 21/215* (2013.01);
(Continued)

(58) Field of Classification Search
CPC ... B60R 21/2342; B60R 21/215; B60R 21/26; B60R 21/235; B60R 21/23138;
(Continued)

(56) References Cited

U.S. PATENT DOCUMENTS 5,601,332 A * 2/1997 Schultz ................ B60N 2/4235
280/728.3
6,003,939 A * 12/1999 Nakai ................... B60R 21/207
297/216.13
(Continued)

FOREIGN PATENT DOCUMENTS

JP    H09-286298 A    11/1997
JP    H10-6906 A      1/1998
(Continued)

OTHER PUBLICATIONS

Jun. 16, 2015 Extended Search Report issued in European Patent Application No. 13822290.6.
(Continued)

*Primary Examiner* — Karen Beck
(74) *Attorney, Agent, or Firm* — Oliff PLC

(57) ABSTRACT

A side airbag deployment direction control structure includes an airbag module installed at the vehicle width direction outer side of a door-side side frame portion. During inflation and deployment of a side airbag of airbag module, a stitched portion between a front cover and a front side cover of a seat cover ruptures under inflation pressure of the side airbag. This forms an opening for the side airbag to inflate and deploy to the outer side of a seatback. Note that the stitched portion is provided further to the seat width direction inner side than a center of the inflator. Further, a reaction force plate is positioned at the vehicle width direction outer side of the airbag module and includes a side reaction force face of which a front end portion extends (Continued)

further toward the vehicle front side than the airbag module and the door-side side frame portion.

12 Claims, 6 Drawing Sheets

(51) Int. Cl.
  *B60R 21/231* (2011.01)
  *B60R 21/235* (2006.01)
  *B60R 21/26* (2011.01)
  *B60R 21/215* (2011.01)
  *B60R 21/16* (2006.01)
(52) U.S. Cl.
  CPC ...... *B60R 21/235* (2013.01); *B60R 21/23138* (2013.01); *B60R 21/26* (2013.01); *B60R 2021/161* (2013.01); *B60R 2021/2076* (2013.01); *B60R 2021/21537* (2013.01); *B60R 2021/23146* (2013.01); *B60R 2021/23519* (2013.01)
(58) Field of Classification Search
  CPC ........ B60R 21/207; B60R 2021/21537; B60R 2021/2076; B60R 2021/161; B60R 2021/23146; B60R 2021/23519
  USPC ...................................................... 280/728.2
  See application file for complete search history.

(56) References Cited

U.S. PATENT DOCUMENTS

| | | | |
|---|---|---|---|
| 6,099,026 A | 8/2000 | Ando et al. | |
| 6,206,466 B1* | 3/2001 | Komatsu | B60R 21/207 280/728.3 |
| 6,450,528 B1* | 9/2002 | Suezawa | B60R 21/207 280/730.2 |
| 7,344,151 B2* | 3/2008 | Sonoda | B60R 21/16 280/730.1 |
| 7,530,594 B2* | 5/2009 | Sonoda | B60R 21/16 280/730.1 |
| 7,681,907 B2* | 3/2010 | Svenbrant | B60R 21/207 280/728.2 |
| 8,123,246 B2* | 2/2012 | Gilbert | B60R 21/207 280/728.2 |
| 8,152,197 B2* | 4/2012 | Taguchi | B60R 21/207 280/728.2 |
| 8,602,449 B2* | 12/2013 | Kojima | B60N 2/449 280/728.2 |
| 8,651,518 B2* | 2/2014 | Shamoto | B60N 2/289 280/730.2 |
| 2006/0066078 A1* | 3/2006 | Hofmann | B60R 21/207 280/730.2 |
| 2006/0255572 A1* | 11/2006 | Svenbrandt | B60R 21/207 280/730.2 |
| 2007/0273129 A1* | 11/2007 | Inoue | B60R 21/207 280/730.2 |
| 2010/0117337 A1* | 5/2010 | Yamauchi | B60R 21/207 280/728.2 |
| 2010/0156071 A1* | 6/2010 | Taguchi | B60R 21/207 280/730.2 |
| 2013/0200599 A1* | 8/2013 | Shamoto | B60N 2/289 280/730.2 |
| 2015/0151711 A1* | 6/2015 | Fujiwara | B60R 21/207 280/728.2 |
| 2016/0009247 A1* | 1/2016 | Fujiwara | B60R 21/2171 280/728.2 |

FOREIGN PATENT DOCUMENTS

| | | |
|---|---|---|
| JP | H10-244895 A | 9/1998 |
| JP | 3329280 B2 | 9/2002 |
| JP | 2007-261500 A | 10/2007 |
| JP | 2008-080988 A | 4/2008 |
| JP | 2008-087631 A | 4/2008 |
| JP | 4720706 B2 | 7/2011 |

OTHER PUBLICATIONS

Sep. 17, 2013 International Search Report issued in Application No. PCT/JP2013/066398.

* cited by examiner

SIDE AIRBAG DEPLOYMENT DIRECTION CONTROL STRUCTURE

TECHNICAL FIELD

The present invention relates to a deployment direction control structure that controls the deployment direction of a side airbag included in a vehicle side airbag device.

BACKGROUND ART

A vehicle side-on collision occupant protection device described in Patent Document 1 (Japanese Patent Application Laid-Open (JP-A) No. 2008-080988) includes a side airbag module installed inside a side support of a seatback at the vehicle width direction outer side of a seat side frame, and a bracket (side reaction force plate) fixed at the seat side frame. The bracket includes an extension portion extending in the vehicle front-rear direction at the vehicle width direction outer side of the side airbag module. A vehicle front side end portion of the extension portion extends as far as the vicinity of a front end edge portion (frame portion) of the side support, and the side airbag is supported from the door side during initial deployment of the side airbag. This enables the occupant restraining force of the side airbag to be increased at an early stage.

Patent Document 2 (JP-A No. H09-286298) and Patent Document 3 (JP-A No. 2008-087631) below are examples of related art publications relevant to the invention of the present invention.

RELATED PATENT DOCUMENTS

Patent Document 1: Japanese Patent Application Laid-Open (JP-A) No. 2008-080988
Patent Document 2: Japanese Patent Application Laid-Open (JP-A) No. H09-286298
Patent Document 3: Japanese Patent Application Laid-Open (JP-A) No. 2008-087631

SUMMARY OF INVENTION

Technical Problem

In protection devices such as that described above, a stitched portion of a seat cover positioned at a the front end edge portion (frame portion) of the side support ruptures during inflation and deployment of the side airbag, causing the side airbag to inflate and deploy toward the outer side of the side support. Since the frame portion is positioned further to the vehicle width direction outer side than the side airbag module, the side airbag inflates and deploys toward the vehicle front side and the vehicle width direction outer side (the opposite side to the occupant). There is accordingly room for improvement with respect to increasing the initial performance to restrain the occupant by the side airbag.

In consideration of the above circumstances, an object of the present invention is to obtain a side airbag deployment direction control structure enabling an improvement in the initial restraint to inflate and deploy by a side airbag.

Solution to Problem

A side airbag deployment direction control structure of a first aspect of the present invention includes a vehicle side airbag device that includes an airbag module installed inside a vehicle width direction outer side side portion of a seatback configured to include a side airbag and an inflator, and that inflates and deploys the side airbag toward a vehicle front side with gas from the inflator when a vehicle side-on collision has been detected or predicted, and a rupture portion that, as viewed along a seatback height direction, is provided at a seat cover further to a seat width direction inner side than a center of the inflator and further to the seat width direction inner side than a stitched portion between a front side cover and a side cover of a seat cover of the seatback, and that forms an opening to inflate and deploy the side airbag to outside the seatback by rupturing under inflation pressure from the side airbag.

In the first aspect, the airbag module of the vehicle side airbag device is installed inside the vehicle width direction outer side side portion of the seatback. The side airbag device inflates and deploys the side airbag of the airbag module toward the vehicle front side with gas from the inflator when a vehicle side-on collision has been detected or predicted. When this is performed, the rupture portion provided at the seat cover at a front face side of the seatback ruptures under inflation pressure from the side airbag. The opening to inflate and deploy the side airbag to outside the seatback is thus formed, and the side airbag deploys through the opening. Note that as viewed along the seatback height direction, the rupture portion is provided at the seat cover further to the seat width direction inner side than the center of the inflator and further to the seat width direction inner side than the stitched portion between the front side cover and the side cover of the seat cover. The side airbag inflating and deploying to outside the seatback through the opening formed by rupturing of the rupture portion accordingly inflates and deploys toward the vehicle front side and the vehicle width direction inner side (occupant side). This enables the deployment direction of the side airbag to be controlled toward the occupant side, such that the side airbag can be made to contact the occupant at an early stage during initial deployment of the side airbag. Initial performance to restrain the occupant by the side airbag can accordingly be improved as a result.

According to a side airbag deployment direction control structure of a second aspect of the present invention, in the first aspect, the rupture portion is a stitched portion between a front cover and the front side cover of the seat cover.

In the second aspect, the rupture portion (tear seam) is configured by the stitched portion between the front cover and the front side cover of the seat cover, namely by an existing stitched portion of the seat cover of the seatback. The rupture portion can accordingly be set simply by making a slight modification to an existing seatback, enabling a simple configuration of the rupture portion. A more pleasing appearance can also be achieved for the seatback than a case in which a rupture portion is set at a separate location to the stitched portion of the seat cover.

According to a side airbag deployment direction control structure of a third aspect of the present invention, in the first aspect, the rupture portion is a stitched portion provided at the front side cover further to a seat width direction outer side than a stitched portion between a front cover and the front side cover of the seat cover.

Due to the above configuration, the third aspect is effective for vehicle models in which, for example, the second aspect cannot be adopted.

According to a side airbag deployment direction control structure of a fourth aspect of the present invention, in any one of the first aspect to the third aspect, the side airbag device includes a reaction force plate installed inside the side portion and fixed at a seatback frame of the seatback, the reaction force plate being positioned at the vehicle width direction outer side of the airbag module and including a side reaction force face which extends further toward the vehicle front side than the airbag module.

In the fourth aspect, the reaction force plate is fixed at the seatback frame of the seatback. The reaction force plate is positioned at the vehicle width direction outer side of the airbag module and includes the side reaction force face extending further toward the vehicle front side than the airbag module. The side reaction force face can accordingly control the deployment direction of the side airbag toward the vehicle width direction inner side, and the side reaction force face can support the side airbag from the vehicle width direction outer side during initial deployment of the side airbag. The occupant restraining force of the side airbag can accordingly be increased at an earlier stage.

According to a side airbag deployment direction control structure of a fifth aspect of the present invention, in the fourth aspect, a front end portion of the side reaction force face includes a guide face that is angled or curved so as to approach the vehicle width direction inner side on progression toward the vehicle front side.

In the fifth aspect, when the side airbag inflates and deploys along the side reaction force face of the reaction force plate, the side airbag slides against the guide face provided at the front end portion of the side reaction force face. The guide face is angled or curved so as to approach the vehicle width direction inner side on progression toward the vehicle front side, thereby enabling the deployment direction of the side airbag to be actively controlled (guided) toward the vehicle front side and the vehicle width direction inner side (occupant side). The side airbag can accordingly contact the occupant at an earlier stage, thereby enabling an efficient improvement in the initial performance to restrain the occupant by the side airbag.

According to a side airbag deployment direction control structure of a sixth aspect of the present invention, in any one of the first aspect to the third aspect, the airbag module includes an airbag case that accommodates the side airbag prior to inflation and deployment, and the airbag case includes a bag deployment opening formed at a vehicle width direction inner side portion of a front portion of the airbag case, and a door portion which is coupled to a rear end edge of the bag deployment opening through a hinge portion and which closes off the bag deployment opening, and the side airbag inflates and deploys through the bag deployment opening to outside of the airbag case by the door portion opening under inflation pressure of the side airbag. Note that the "front portion" of the sixth aspect refers to the front portion when the airbag case is divided into a front portion and a rear portion.

In the seventh aspect, the door portion provided at the airbag case opens under inflation pressure of the side airbag during inflation and deployment of the side airbag. The side airbag accordingly inflates and deploys to outside of the airbag case through the bag deployment opening formed at the vehicle width direction inner side portion front portion of the airbag case. The side airbag that has inflated and deployed to outside the airbag case thereby ruptures the rupture portion of the seat cover and inflates and deploys to outside the seatback. Note that forming the bag deployment opening at the vehicle width direction inner side of the front portion of the airbag case enables the deployment direction of the side airbag that inflates and deploys through the bag deployment opening to be controlled toward the vehicle width direction inner side (occupant side). The side airbag that inflates and deploys through the bag deployment opening to outside the airbag case can also be supported from the vehicle width direction outer side by the vehicle width direction outer side wall of the airbag case. The side airbag can accordingly be made to contact the occupant at an earlier stage, enabling an improvement in the initial performance to restrain the occupant by the side airbag.

According to a side airbag deployment direction control structure of a seventh aspect of the present invention, in the sixth aspect, the airbag case is made out of resin, and deformation suppressing reinforcement portions are spanned between a front wall and a vehicle width direction outer side wall of the airbag case, and between the vehicle width direction outer side wall and a rear wall of the airbag case.

In the seventh aspect, the airbag case is made out of resin, thereby enabling a reduction in weight. The resin airbag case is further formed with the deformation suppressing reinforcement portions between the front wall and the vehicle width direction outer side wall, and between the vehicle width direction outer side wall and the rear wall. Unintentional deformation of the vehicle width direction outer side wall toward the vehicle width direction outer side under deployment reaction force from the side airbag can accordingly be suppressed.

According to a side airbag deployment direction control structure of an eighth aspect of the present invention, in the fourth aspect or the fifth aspect, the airbag module and the reaction force plate are fixed at the seatback frame through a bracket, which is fixed at the seatback frame, by a stud bolt, which is provided at a gas generation device that is a constituent member of the airbag module, passing through the bracket and through the reaction force plate and being screwed into a nut.

According to a side airbag deployment direction control structure of a ninth aspect of the present invention, in the sixth aspect or the seventh aspect, the airbag module and the airbag case are fixed at the seatback frame through a bracket, which is fixed at the seatback frame of the seatback, by a stud bolt, which is provided at a gas generation device that is a constituent member of the airbag module, passing through the bracket and through a rear wall of the airbag case and being screwed into a nut.

According to a side airbag deployment direction control structure of a tenth aspect of the present invention, in the eighth aspect or the ninth aspect, the bracket is configured by an attachment portion which is fixed at the seatback frame and a module fastening portion which extends from the attachment portion toward the vehicle width direction outer side, and the stud bolt passes through the module fastening portion.

Advantageous Effects of Invention

As described above, the side airbag deployment direction control structure of the present invention enables an improvement in the initial restraint to inflate and deploy by the side airbag.

DESCRIPTION OF EMBODIMENTS

First Exemplary Embodiment

Figure 1:
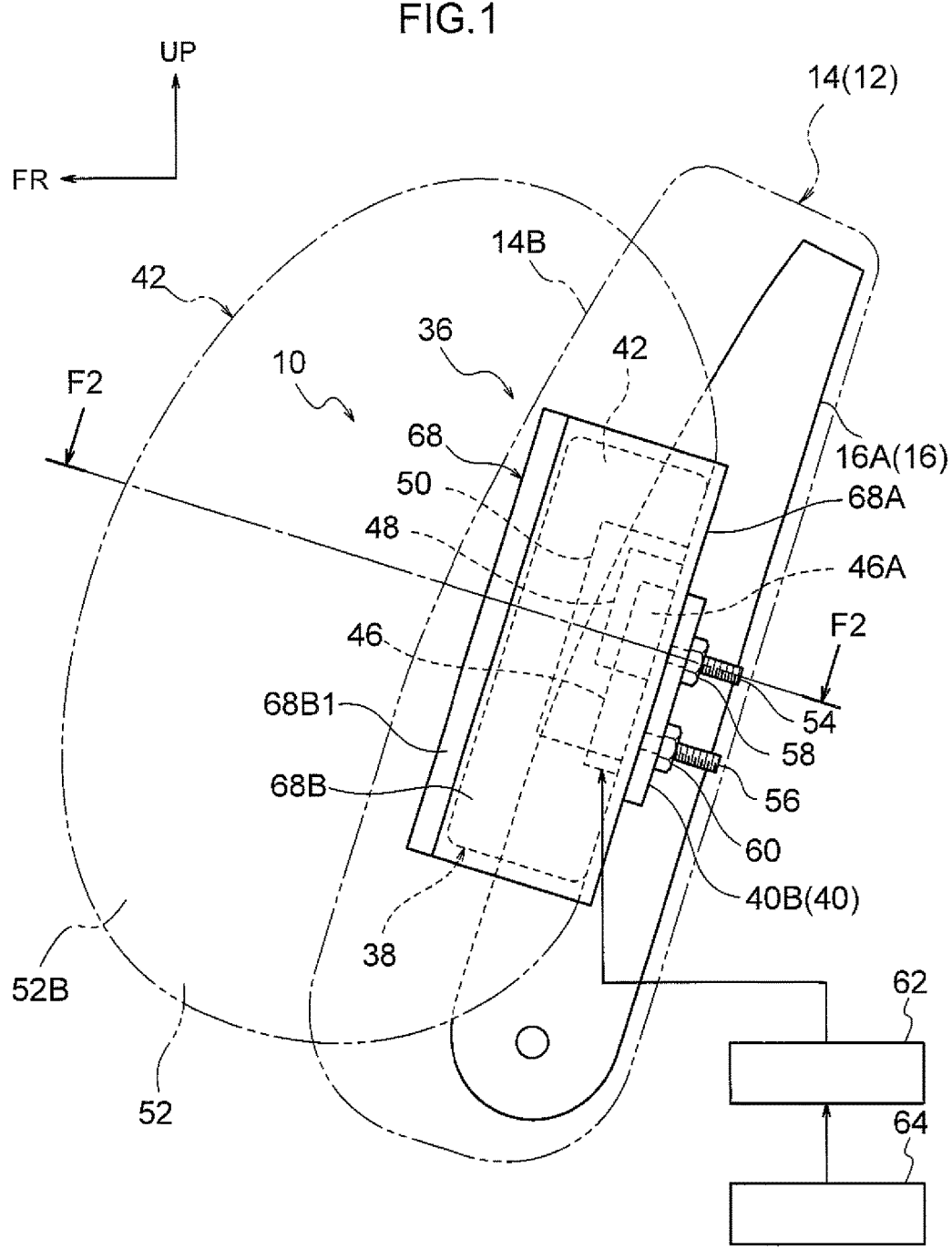
FIG. 1 is a side view illustrating a vehicle seat applied with a side airbag deployment direction control structure according to a first exemplary embodiment of the present invention.

Explanation follows regarding a side airbag deployment direction control structure 10 according to a first exemplary embodiment of the present invention, with reference to FIG. 1 to FIG. 4. Note that in the drawings, the arrow FR, the arrow UP, and the arrow OUT respectively indicate the vehicle front direction (direction of travel), upward direction, and width direction outer side. In the following explanation, unless specifically indicated otherwise, reference simply to the front-rear and up-down directions refers to the front and rear in the vehicle front-rear direction, and up and down in the vehicle up-down direction.

(Configuration)

FIG. 1 is a side view illustrating a seatback 14 configuring a backrest of a vehicle seat 12, applied with the side airbag device deployment direction control structure 10 according to the first exemplary embodiment, as viewed from the vehicle width direction outer side. A lower end portion of the seatback 14 is reclinably coupled to a rear end portion of a seat cushion, not illustrated in the drawings, and a headrest, not illustrated in the drawings, is coupled to an upper end portion of the seatback 14. Note that in the present exemplary embodiment, the front-rear direction, left-right direction (width direction), and up-down direction of the vehicle seat 12 respectively correspond to the front-rear direction, left-right direction (width direction), and up-down direction of the vehicle.

Figure 2:
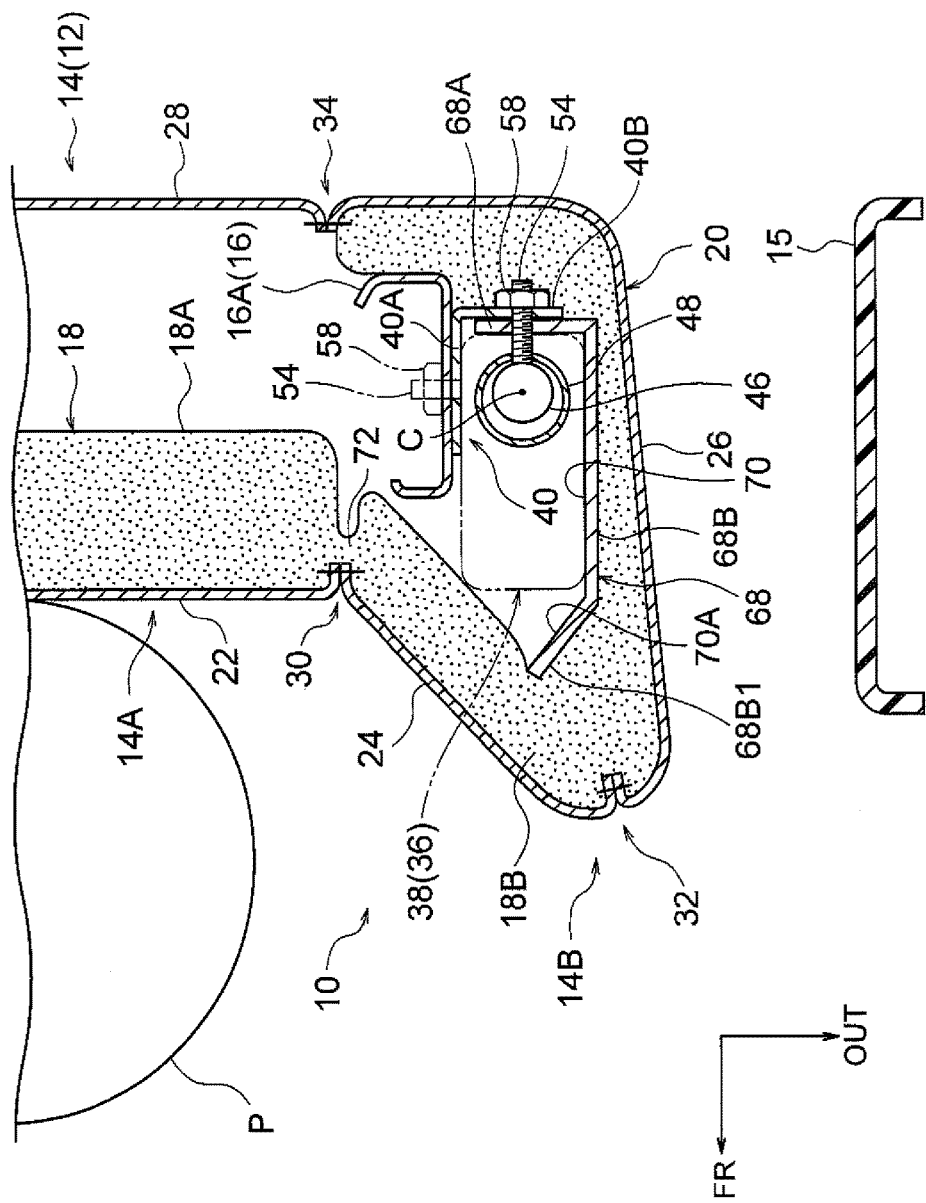
FIG. 2 is an enlarged cross-section illustrating a cross-section plane taken along line F2-F2 in FIG. 1.
Figure 3:
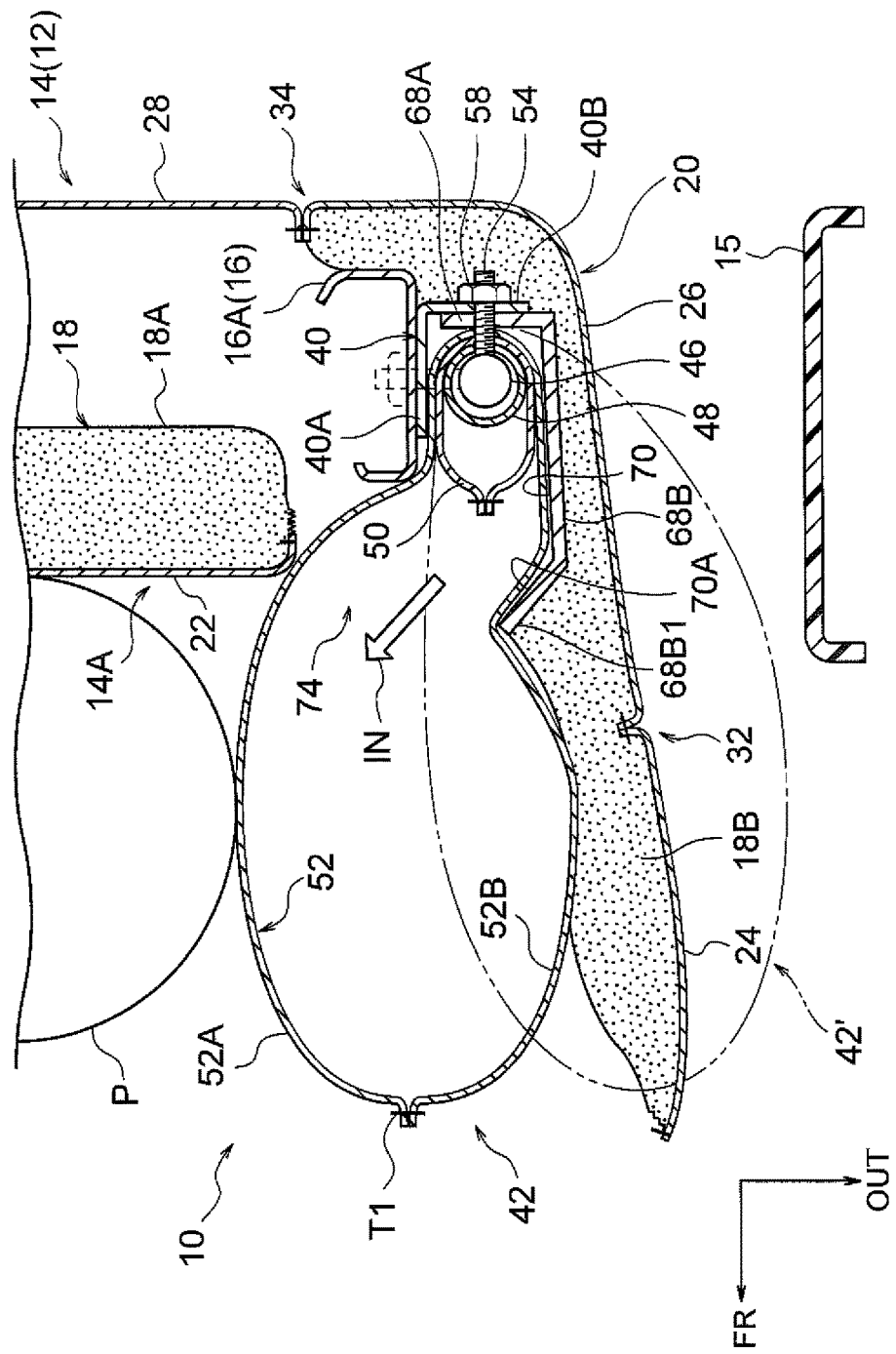
FIG. 3 is a cross-section corresponding to FIG. 2, illustrating an inflated and deployed state of a side airbag of a vehicle side airbag device according to the first exemplary embodiment of the present invention.

As illustrated in FIG. 2, the seatback 14 includes a main body portion (general portion) 14A that supports the back of a seated occupant P (an occupant seated in the vehicle seat 12, referred to below as the "occupant P"), a door-side side portion 1413 (vehicle width direction outer side side portion) positioned at the vehicle width direction outer side of the main body portion 14A, and a tunnel-side side portion (vehicle width direction inner side side portion, not illustrated in the drawings) positioned at the vehicle width direction inner side of the main body portion 14A. The door-side side portion 14B and the tunnel-side side portion project out further toward the vehicle front side than the main body portion 14A, and function as what are referred to as side supports. Note that FIG. 2 and FIG. 3 illustrate a B pillar garnish 15.

The seatback 14 includes a seatback frame 16 that is a frame member, a seat pad 18 that is a cushion member supported by the seatback frame 16, and a seat cover 20 that is a cover covering a front face of the seat pad 18.

The seatback frame 16 is configured by left and right side frame portions 16A disposed inside the door-side side portion 14B and the tunnel-side side portion, and an upper frame portion, not illustrated in the drawings, that couples together upper end portions of the left and right side frame portions 16A. Note that only the vehicle width direction outer side side frame portion 16A (referred to below as the door-side side frame portion 16A) is illustrated in FIG. 1 to FIG. 3. In the present exemplary embodiment, the door-side side frame portion 16A is formed with an open cross-section profile opening toward the seat width direction inner side as viewed along the height direction of the seatback 14.

The seat pad 18 is configured by a pad main body portion 18A provided at the main body portion 14A of the seatback 14, a door-side pad side portion 18B provided at the door-side side portion 14B, and a tunnel-side pad side portion, not illustrated in the drawings, provided at the tunnel-side side portion. The door-side pad side portion 18B is formed with a substantially C-shaped cross-section profile open toward the seat width direction inner side, and covers the door-side side frame portion 16A and an airbag module 38, described later, from both vehicle front-rear direction sides and from the vehicle width direction outer side.

The seat cover 20 includes a front cover 22 that covers a front face of the pad main body portion 18A, a front side cover 24 that covers a front face of the door-side pad side portion 18B, a side cover 26 that covers a vehicle width direction outer side face and a rear face of the door-side pad side portion 18B, and a rear cover 28 that is disposed at a back face of the seatback 14. Note that a tunnel-side side portion side, not illustrated in the drawings, of the seat cover 20 has the same basic configuration as the door-side side portion 14B, other than being formed with left-right symmetry thereto.

A vehicle width direction outer side end portion of the front cover 22 and a vehicle width direction inner side end portion of the front side cover 24 are stitched together at a stitched portion 30, and a vehicle width direction outside end portion of the front side cover 24 and a front end portion of the side cover 26 are stitched together at a stitched portion 32. The stitched portion 32 is positioned at a front end edge portion (what is referred to as a frame portion) of the door-side side portion 14B. Moreover, a rear end portion of the side cover 26 and a vehicle width direction outer side end portion of the rear cover 28 are stitched together at a stitched portion 34.

The airbag module 38 (see FIG. 1 and FIG. 2) that is a constituent member of a vehicle side airbag device 36, and a bracket 40 for fixing the airbag module 38 at the door-side side frame portion 16A, are provided at the vehicle width direction outer side of the door-side side frame portion 16A.

The bracket 40 is, for example, formed in an elongated shape from a metal plate material, and is disposed in a state in which the length direction thereof runs along the height direction of the seatback 14. The bracket 40 is configured by a plate shaped attachment portion 40A, that is fixed at a vehicle width direction outer side face of the door-side side frame portion 16A by a means such as welding, and a plate shaped module fastening portion 40B extending from an end portion of the plate shaped attachment portion 40A toward the vehicle width direction outer side. The bracket 40 is formed with an L-shaped cross-section profile as viewed along the height direction of the seatback 14.

The airbag module 38 is disposed at the vehicle width direction outer side of the attachment portion 40A and at the front side of the module fastening portion 40B. The airbag module 38 is configured by a side airbag 42 (see FIG. 1 and FIG. 3), an inflator 46 that ejects gas into the side airbag 42, a diffuser 48 that regulates the flow of the gas ejected from the inflator 46, and an inner tube (flow regulating cloth) 50 (see FIG. 1 and FIG. 3) that guides the gas flow regulated by the diffuser 48 toward an upper side and a lower side. Note that the inflator 46 is configured by the diffuser 48 together with a gas generation device. In FIG. 2, the side airbag 42 and the inner tube 50 are omitted for clarity of illustration.

In the airbag module 38, the side airbag 42 is folded and modulized (unitized) together with the inflator 46, the diffuser 48, and the inner tube 50, and is installed (housed) inside the door-side side portion 14B. The airbag module 38 is configured such that under the pressure of the gas ejected from the inflator 46, the side airbag 42 inflates and deploys toward the vehicle front side of the door-side side portion 14B (between the occupant P and a side door, not illustrated in the drawings) (the state illustrated in FIG. 1 and FIG. 3). Note that the front, rear, up, and down directions of the side airbag 42 in the following explanation indicate directions in an inflated and deployed state of the side airbag 42 unless specifically indicated otherwise, and substantially correspond to the front, rear, up, and down directions of the seatback 14.

The side airbag 42 is formed in a pocket shape by folding a single base cloth 52, cut out from, for example, a Nylon-based or polyester-based material, in two, and sewing up an outer peripheral edge portion thereof at a sewn portion Ti (see FIG. 3). Note that configuration may be adopted in which the side airbag 42 is formed by sewing up the outer peripheral edge portions of two overlaid base cloths, and the manner in which the side airbag 42 is sewn is not particularly limited. Moreover, in the present exemplary embodiment, the side airbag 42 is configured by what is referred to as single chamber type side airbag, however the configuration of the side airbag is not limited thereto, and may, for example, be what is referred to as a twin chamber type side airbag, partitioned from front to rear or from top to bottom.

As illustrated in FIG. 3, in the inflated and deployed state, a fold line where the base cloth 52 is folded in two is positioned at a rear end portion of the side airbag 42, with one side portion 52A across the fold line disposed facing the vehicle width direction inner side (seated occupant side), and another side portion 52B across the fold line disposed facing the vehicle width direction outer side (the side of the side door, not illustrated in the drawings). As illustrated in FIG. 1, the side airbag 42 is formed with an elongated, substantially elliptical shape running along the height direction of the seatback 14 when viewed from the side in the inflated and deployed state, and is formed with a size capable of restraining the shoulder, chest, abdomen, and hip of the seated occupant. Note that the size of the side airbag 42 is set based on a World Side Impact Dummy (WorldSID) seated in the vehicle seat 12. The size of the side airbag 42 is not limited thereto, and may be modified as appropriate.

The inflator 46 is what is referred to as a cylinder type inflator, and is formed in a circular columnar shape. The inflator 46 is accommodated inside the side airbag 42 in a state in which the axial direction runs along the height direction of the seatback 14, and is disposed at a rear end portion of an up-down direction intermediate portion of the side airbag 42.

A pair of upper and lower stud bolts 54, 56 (see FIG. 1) project out from an outer peripheral portion of the inflator 46 toward the rear side. The stud bolts 54, 56 pass through a rear end portion of the base cloth 52 and the module fastening portion 40B of the bracket 40, and nuts 58, 60 are screwed to leading end sides thereof. The side airbag 42 is thereby fixed at the door-side side frame portion 16A with the inflator 46 and the bracket 40 interposed therebetween by what is referred to as back face fastening. Note that a portion of the diffuser 48, described later, a portion of the inner tube 50, and a portion of a reaction force plate 68 are interposed between the inflator 46 and the module fastening portion 40B. The attachment method of the inflator 46 to the door-side side frame portion 16A is not limited to back face fastening, and may employ what is referred to as side face fastening (see the stud bolt 54 and the nut 58 illustrated by the double-dotted intermittent line in FIG. 2).

A gas ejection portion 46A (see FIG. 1) is provided at an upper end side of the inflator 46. The gas ejection portion 46A is formed with plural gas ejection holes in a row around the circumferential direction of the inflator 46, and on actuation of the inflator 46, gas is ejected through the plural gas ejection holes in a radial pattern. As illustrated in FIG. 1, the inflator 46 is electrically connected to a side collision ECU 62 installed in the vehicle. A side collision sensor 64 that detects a side-on collision is electrically connected to the side collision ECU 62. The side collision ECU 62 is configured so as to actuate the inflator 46 when (the inevitability of) a side-on collision has been detected based on a signal from the side collision sensor 64. Note that in a case in which a pre-crash sensor that predicts (foresees) a side-on collision is electrically connected to the side collision ECU 62, the side collision ECU 62 may be configured so as to actuate the inflator 46 when a side-on collision has been predicted based on a signal from the pre-crash sensor.

The diffuser 48 is, for example, formed from a metal material in a circular cylinder shape. The diffuser 48 is disposed in a state with the axial direction running along the height direction of the seatback 14, and an upper side of the inflator 46 is inserted inside the diffuser 48. The upper side stud bolt 54 of the inflator 46 passes through the diffuser 48, and a portion of the diffuser 48 is interposed between the inflator 46 and the rear end portion of the base cloth 52. The diffuser 48 is thereby fixed at the bracket 40 using the inflator 46. Note that a portion of the inner tube 50, described later, is interposed between the diffuser 48 and the rear end portion of the base cloth 52. The diffuser 48 covers the gas ejection portion 46A of the inflator 46, and is configured such that gas ejected from the gas ejection portion 46A is ejected toward the upper side and the lower side through upper and lower openings of the diffuser 48. Note that there is no limitation to a configuration in which the stud bolts are provided at the inflator, and the inflator may be fixed at the diffuser, at which stud bolts have been provided.

The inner tube 50 is formed by sewing a cloth of a similar material to the base cloth 52 into a tube shape, and is open at upper and lower end portions. The inner tube 50 is provided inside the side airbag 42 in a state covering the inflator 46 and the diffuser 48, and is disposed at a rear end portion of an up-down direction intermediate portion of the side airbag 42. The upper and lower stud bolts 54, 56 of the inflator 46 pass through the inner tube 50, and a portion of the inner tube 50 is interposed between the inflator 46 and the rear end portion of the base cloth 52 of the side airbag 42. The inner tube 50 is thereby fixed at the bracket 40 using the inflator 46. Note that a portion of the diffuser 48 is interposed between an upper portion of the inflator 46 and the inner tube 50. The inner tube 50 has a function to guide the gas ejected through the upper and lower openings of the diffuser 48 to an upper portion side and a lower portion side inside the side airbag 42.

(Main Portions of the Present Exemplary Embodiment)

Explanation follows regarding main portions of the present exemplary embodiment. As illustrated in FIG. 1 to FIG.

3, the vehicle side airbag device 36 of the present exemplary embodiment includes the reaction force plate (reaction force member) 68 that controls (guides) the deployment direction of the side airbag 42. The reaction force plate 68 is, for example, formed from a metal plate material in an elongated shape, and is installed inside the door-side side portion 14B in a state in which the length direction runs along the height direction of the seatback 14. The reaction force plate 68 includes a fixing wall 68A superimposed with a front face of the module fastening portion 40B of the bracket 40, and an outside wall (side wall) 68B extending from a vehicle width direction outer side end portion of the fixing wall 68A toward the front side. The reaction force plate 68 is formed with a substantially L-shaped cross-section profile as viewed along the height direction of the seatback 14.

The fixing wall 68A is interposed between the airbag module 38 and the module fastening portion 40B, and the upper and lower stud bolts 54, 56 of the inflator 46 pass through the fixing wall 68A. The reaction force plate 68 is thus fixed at the bracket 40 using the inflator 46.

The outside wall 68B is positioned at the vehicle width direction outer side of the airbag module 38, and is disposed contacting, or in close proximity to, the airbag module 38. The outside wall 68B extends further toward the vehicle front side than the airbag module 38, and the outside wall 68B covers the entire airbag module 38 from the vehicle width direction outer side. A vehicle width direction inner side face of the outside wall 68B configures a side reaction force face 70 that bears deployment reaction force of the side airbag 42.

A front end portion of the outside wall 68B projecting out further toward the vehicle front side than the airbag module 38 and the door-side side frame portion 16A, is provided with a guide portion 68B1 running at an angle with respect to the vehicle front-rear direction so as to approach the vehicle width direction inner side on progression toward the vehicle front side. A vehicle width direction inner side face of the guide portion 68B1 configures a guide face 70A that guides the deployment direction of the side airbag 42. The guide face 70A is angled with respect to the vehicle front-rear direction so as to approach the vehicle width direction inner side on progression toward the vehicle front side. Note that the guide face 70A may also be configured curving toward the vehicle width direction inner side on progression toward the vehicle front side.

Moreover, in the present exemplary embodiment, the stitched portion 30 between the front cover 22 and the front side cover 24 configures a rupture portion (burst line). Namely, at the stitched portion 30, the front cover 22 and the front side cover 24 are stitched together using a weaker thread than the thread used to stitch together the other stitched portions (the stitched portions 32, 34 and so on). Moreover, in the present exemplary embodiment, a weakened portion (thin portion) 72 that is weaker than other portions is configured at the rear of the stitched portion 30 between the pad main body portion 18A and the door-side pad side portion 18B of the seat pad 18. Accordingly, during inflation and deployment of the side airbag 42, the stitched portion 30 and the weakened portion 72 rupture under inflation pressure of the side airbag 42. The stitched portion 30 and the weakened portion 72 are provided further to the seat width direction inner side (vehicle width direction inner side) than the door-side side frame portion 16A and the airbag module 38, and are also positioned further to the seat width direction inner side than the center C of the inflator 46, and further to the seat width direction inner side than the stitched portion 32 between the front side cover 24 and the side cover 26 as viewed along the height direction of the seatback 14. Rupturing of the stitched portion 30 and the weakened portion 72 forms an opening 74 (see FIG. 3) at the front face side of the seatback 14, such that the side airbag 42 inflates and deploys toward the outer side of the seatback 14.

(Operation and Advantageous Effects)

Next, explanation follows regarding operation and advantageous effects of the first exemplary embodiment.

In the present exemplary embodiment, the airbag module 38 of the vehicle side airbag device 36 is provided inside the door-side side portion 14B of the seatback 14. When the side collision ECU 62 detects a vehicle side-on collision based on a signal from the side collision sensor 64, the side airbag device 36 actuates the inflator 46 provided at the airbag module 38 and inflates and deploys the side airbag 42 toward the vehicle front side. When this is performed, the stitched portion (rupture portion) 30 provided at the seat cover 20 at the front face side of the seatback 14 ruptures under inflation pressure of the side airbag 42. This forms the opening 74 for the side airbag 42 to inflate and deploy toward the outer side of the seatback 14, and the side airbag 42 inflates and deploys through the opening 74.

Note that the stitched portion 30 is provided further toward the seat width direction inner side than the airbag module 38. The side airbag 42 that inflates and deploys to outside the seatback 14 through the opening 74 formed by the rupture of the stitched portion 30 accordingly inflates and deploys toward the vehicle front side and the vehicle width direction inner side (occupant side). Since the deployment direction of the side airbag 42 can thus be controlled toward the occupant side, the side airbag 42 can contact the occupant P at an early stage during initial deployment of the side airbag 42. Initial performance to restrain the occupant P by the side airbag 42 can be improved as a result.

Moreover, in the present exemplary embodiment the rupture portion (tear seam) is configured by the stitched portion 30 between the front side cover 24 and the front cover 22 included in the seat cover 20, namely by the existing stitched portion 30 of the seat cover 20. The rupture portion can accordingly be set simply by making a slight modification to the existing seatback 14, enabling a simple configuration of the rupture portion. A more pleasing appearance can also be achieved for the seatback 14 than when a rupture portion is set at a separate location to the stitched portion of the seat cover 20.

Moreover, in the present exemplary embodiment, the reaction force plate 68 is fixed at the door-side side frame portion 16A of the seatback 14. The reaction force plate 68 includes the side reaction force face 70 that is positioned at the vehicle width direction outer side of the airbag module 38 and extends further to the vehicle front side than the airbag module 38. The side reaction force face 70 can accordingly control the deployment direction of the side airbag 42 toward the vehicle width direction inner side, and the side reaction force face 70 can support the side airbag 42 from the vehicle width direction outer side during initial deployment of the side airbag 42. The occupant restraining force of the side airbag 42 can accordingly be increased at an earlier stage.

In the present exemplary embodiment, the front end portion of the side reaction force face 70 is provided with the guide face 70A angled so as to approach the vehicle width direction inner side on progression toward the vehicle front side. Accordingly, on inflation and deployment of the side airbag 42 along the side reaction force face 70, the guide face 70A provided at the front end portion of the side reaction force face 70 slides against the side airbag 42. The guide face 70A is angled so as to approach the vehicle width direction inner side on progression toward the vehicle front side, thereby enabling the deployment direction of the side airbag 42 to be actively controlled (guided) toward the vehicle front side and vehicle width direction inner side (occupant side) (see arrow IN in FIG. 3). The side airbag 42 can accordingly contact the occupant P at an earlier stage, thereby enabling an efficient improvement in the initial performance to restrain the occupant P by the side airbag 42.

Note that the double-dotted intermittent line in FIG. 3 illustrates an inflated and deployed state of a side airbag 42' of a Comparative Example of the present exemplary embodiment. In the Comparative Example, the reaction force plate 68 of the present exemplary embodiment is omitted, and a rupture portion is configured at the stitched portion 32 of the seat cover 20 positioned at the frame portion of the door-side side portion 14B. Compared to such a configuration, the present exemplary embodiment enables a large improvement in the initial performance to restrain the occupant P by the side airbag 42.

<Additional Explanation of the First Exemplary Embodiment>

In the first exemplary embodiment, the vehicle side airbag device 36 is configured to include the reaction force plate 68, however the present invention is not limited thereto, and configuration may be made with the reaction force plate 68 omitted. In such cases, the deployment direction of the side airbag 42 can still be controlled toward the vehicle width direction inner side due to configuring the rupture portion at the stitched portion 30 between the front side cover 24 and the front cover 22.

Figure 4:
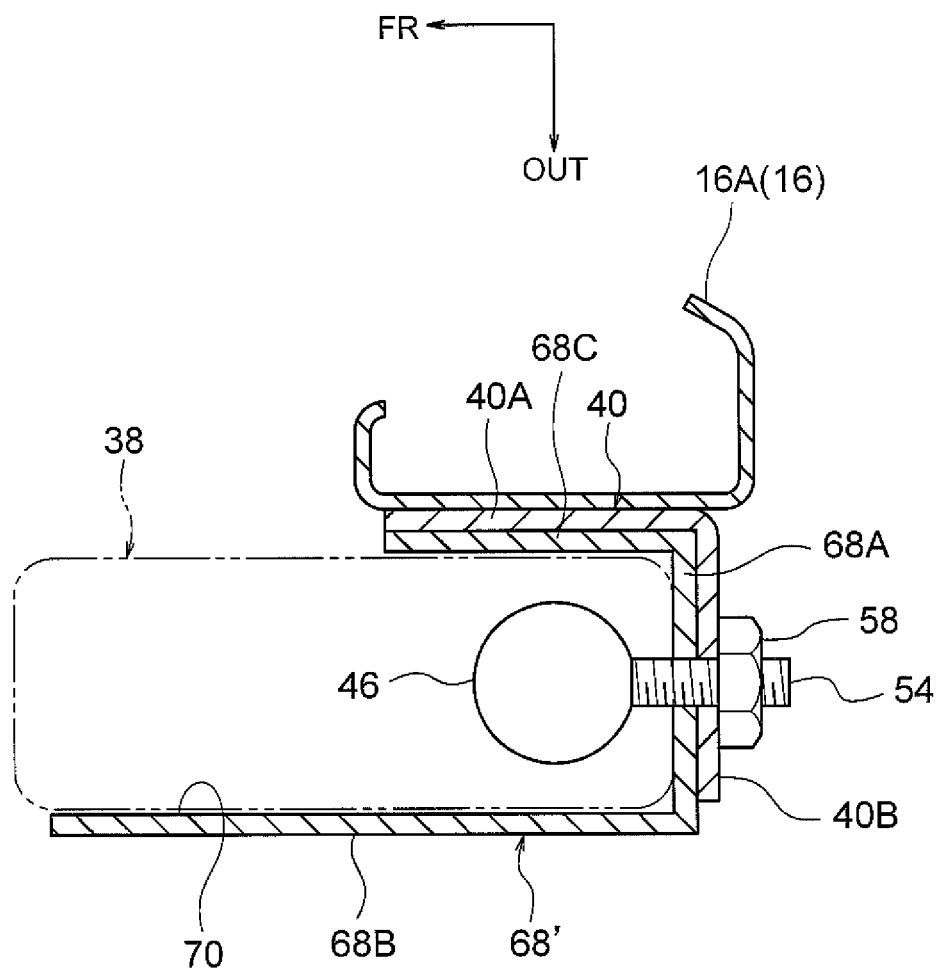
FIG. 4 is a cross-section corresponding to a portion of FIG. 2, illustrating a modified example of a reaction force plate of a side airbag deployment direction control structure according to the first exemplary embodiment of the present invention.

In the first exemplary embodiment, the reaction force plate 68 is configured with a substantially L-shaped cross-section profile, however the present invention is not limited thereto, and configuration such as that of the reaction force plate 68' (modified example) illustrated in FIG. 4 may be made in which an inside wall 68C is provided extending from a vehicle width direction inner side end of the fixing wall 68A toward the vehicle front side (the reaction force plate 68' may be configured with a substantially J-shaped cross-section profile). In this modified example, for example in a case in which modulization (unitization) is performed by assembling the reaction force plate 68' to the airbag module 38, the reaction force plate 68' is well-suited due to being able to give good support to the airbag module 38. This modified example may be adopted in a case in which the reaction force plate 68' and the airbag module 38 can be fixed at the door-side side frame portion 16A only by back face fastening, namely, for example, in a case of using an attachment process in which the reaction force plate 68' and the airbag module 38 are fixed at the door-side side frame portion 16A after covering the seatback frame 16 with the seat pad 18 and the seat cover 20.

In the first exemplary embodiment, the guide face 70A (guide portion 68B1) is provided at the front end portion of the outside wall 68B of the reaction force plate 68, however configuration may be made with the guide face 70A (guide portion 68B1) omitted, as in the modified example illustrated in FIG. 4. In such cases, improved initial performance to restrain the occupant P by the side airbag 42 can still be achieved in comparison to hitherto, due to configuring the rupture portion at the stitched portion 30 between the front side cover 24 and the front cover 22.

In the first exemplary embodiment, the rupture portion is configured by the stitched portion 30 between the front side cover 24 and the front cover 22, however the present invention is not limited thereto, and it is sufficient to provide the rupture portion at the seat cover at the seat width direction inner side of the airbag module and at the front face side of the seatback. For example, configuration may be made in which the rupture portion is provided at a vehicle width direction intermediate portion of the front side cover 24.

Moreover, in the first exemplary embodiment, the weakened portion 72 is configured between the pad main body portion 18A and the door-side pad side portion 18B of the seat pad 18, however the present invention is not limited thereto, and configuration may be made in which the pad main body portion 18A and the door-side pad side portion 18B are pre-divided.

Next, explanation follows regarding other exemplary embodiments of the present invention. Note that the same reference numerals as in the first exemplary embodiment are allocated when configuration and operation are basically the same as that of the first exemplary embodiment, and explanation thereof is omitted.

Second Exemplary Embodiment

Figure 5:
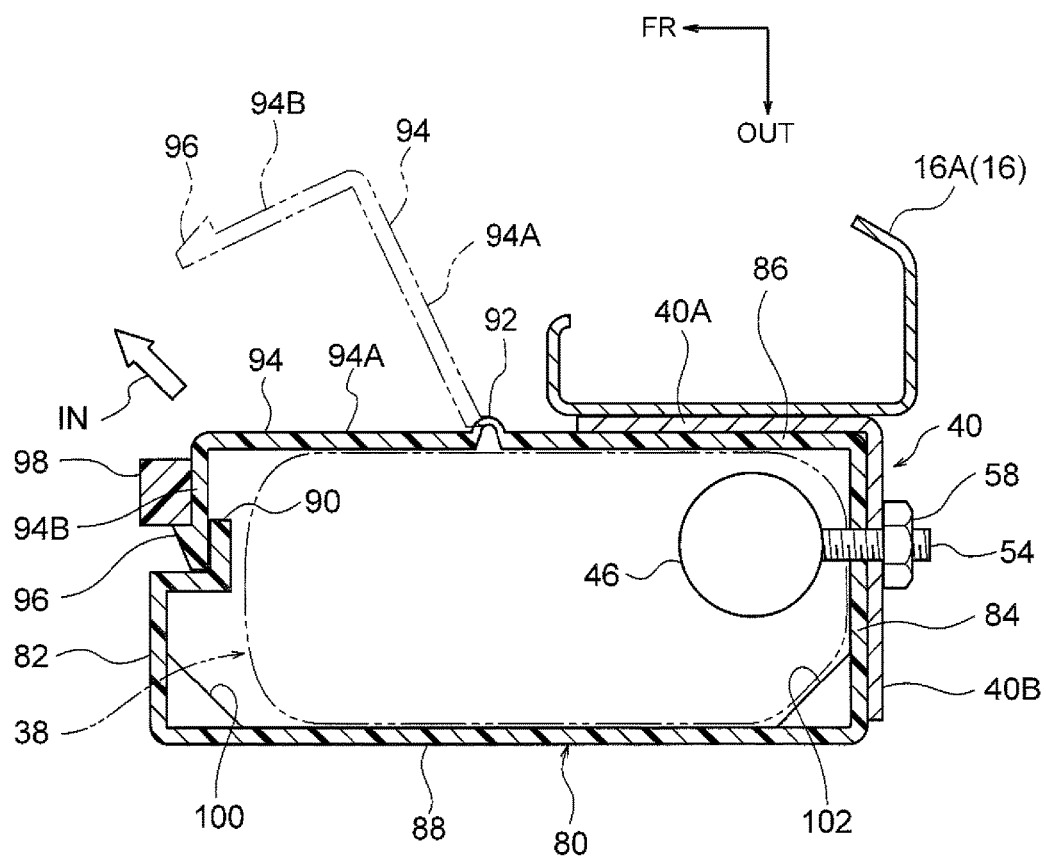
FIG. 5 is a cross-section corresponding to a portion of FIG. 2, illustrating a partial configuration of a side airbag deployment direction control structure according to a second exemplary embodiment of the present invention.

FIG. 5 is a cross-section corresponding to a portion of FIG. 2, illustrating a partial configuration of a side airbag deployment direction control structure according to a second exemplary embodiment of the present invention. In the present exemplary embodiment, the reaction force plate 68 according to the first exemplary embodiment is omitted, and the airbag module 38 is accommodated inside an airbag case (module case) 80. Note that although members such as the seat pad 18 and the seat cover 20 are omitted from illustration in FIG. 5, configuration other than that mentioned above is similar to the configuration of the first exemplary embodiment.

The airbag case 80 is formed from a resin material, and includes a front wall 82, a rear wall 84, a vehicle width direction inner side wall 86, and a vehicle width direction outer side wall 88. The airbag case 80 further includes an upper wall and a lower wall, not illustrated in the drawings, and is formed in a hollow rectangular box shape. The airbag case 80 is positioned at the vehicle width direction outer side of the attachment portion 40A of the bracket 40, and at the front side of the module fastening portion 40B, with the length direction of the airbag case 80 disposed in a state running along the height direction of the seatback 14.

A bag deployment opening 90 is formed at a vehicle width direction inner side portion of a front portion of the airbag case 80. The bag deployment opening 90 is formed by ending the front wall 82 further back toward the vehicle width direction outer side than the rear wall 84, and ending the vehicle width direction inner side wall 86 further back toward the vehicle rear side than the vehicle width direction outer side wall 88. The bag deployment opening 90 is formed further to the vehicle front side than the door-side side frame portion 16A, and is set with the same dimension in the height direction of the seatback 14 as the airbag module 38.

An airbag door (door portion) 94 is integrally coupled across an integral hinge (hinge portion) 92 at a rear end edge of the bag deployment opening 90, namely at a front end portion of the vehicle width direction inner side wall 86. The airbag door 94 includes a forward extension portion 94A extending from the front end portion of the vehicle width direction inner side wall 86 toward the vehicle front, and an outward extension portion 94B extending from a leading end of the forward extension portion 94A toward the vehicle width direction outer side, forming the airbag door 94 in an L-shape as viewed along the height direction of the seatback 14. A pawl portion 96 is formed projecting out toward the vehicle front side at a leading end portion of the outward extension portion 94B, and the pawl portion 96 catches on an engagement portion 98 formed at a vehicle width direction inner side end portion of the front wall 82. The airbag door 94 closes off the bag deployment opening 90.

The airbag case 80 is integrally spanned by respective deformation suppressing ribs (reinforcement portions) 100, 102 between the front wall 82 and the vehicle width direction outer side wall 88, and between the vehicle width direction outer side wall 88 and the rear wall 84. Plural of the ribs 100, 102 are provided side-by-side in the length direction of the airbag case 80, and the ribs 100, 102 increase the rigidity of the vehicle width direction outer side portion of the airbag case 80.

Next, explanation follows regarding operation and advantageous effects of the present exemplary embodiment.

In the present exemplary embodiment, when the side airbag 42 (not illustrated in FIG. 5) is supplied with gas from the inflator 46 and inflates and deploys, the airbag door 94 of the airbag case 80 opens up about the integral hinge 92 under inflation pressure from the side airbag 42 (see the airbag door 94 illustrated by the double-dotted intermittent line in FIG. 5). The bag deployment opening 90 accordingly opens up, and the side airbag 42 inflates and deploys outside the airbag case 80 through the bag deployment opening 90, and the stitched portion 30 of the seat cover 20 ruptures under inflation pressure from the side airbag 42. The opening 74 for the side airbag 42 to inflate and deploy to the outer side of the seatback 14 is thereby formed similarly to in the first exemplary embodiment, and the side airbag 42 inflates and deploys outside the seatback 14 through the opening 74.

Note that the bag deployment opening 90 mentioned above is formed at the vehicle width direction inner side of the front portion of the airbag case 80, enabling the deployment direction of the side airbag 42 inflating and deploying through the bag deployment opening 90 to be controlled toward the vehicle width direction inner side (occupant side) (see the arrow IN in FIG. 5). The vehicle width direction outer side wall 88 of the airbag case 80 can accordingly support the side airbag 42 inflating and deploying outside the airbag case 80 through the bag deployment opening 90 from the width direction outer side. Namely, in the present exemplary embodiment, the vehicle width direction outer side wall 88 of the airbag case 80 functions similarly to the reaction force plate 68 according to the first exemplary embodiment. Since the side airbag 42 can accordingly be made to contact the occupant at an earlier stage, the initial performance to restrain the occupant P by the side airbag 42 can be efficiently increased.

In the present exemplary embodiment, the airbag case 80 is made from resin, enabling a reduction in weight. The deformation suppressing ribs 100, 102 respectively span the resin airbag case 80 between the front wall 82 and the vehicle width direction outer side wall 88, and between the vehicle width direction outer side wall 88 and the rear wall 84, thereby enabling unintentional deformation of the vehicle width direction outer side wall 88 toward the vehicle width direction outer side under deployment reaction force from the side airbag 42 to be suppressed.

Third Exemplary Embodiment

Figure 6:
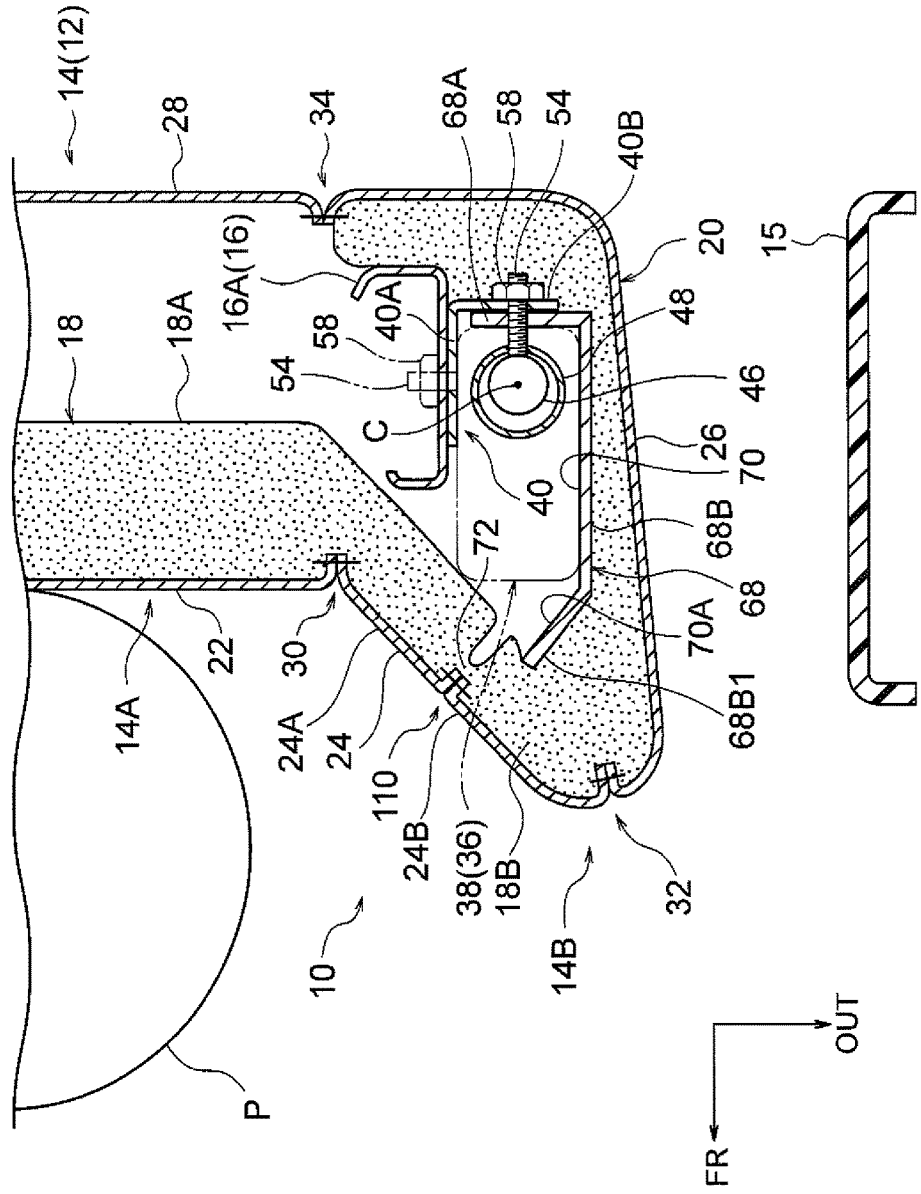
FIG. 6 is a cross-section corresponding to FIG. 2, illustrating a configuration of a side airbag deployment direction control structure according to a third exemplary embodiment of the present invention.

FIG. 6 is a cross-section corresponding to FIG. 2, illustrating configuration of a side airbag deployment direction control structure according to a third exemplary embodiment of the present invention. In the present exemplary embodiment, the stitched portion 30 does not configure a rupture portion, and the rupture portion (burst line) is configured by an additional stitched portion 110 at a seat width direction intermediate portion of the front side cover 24.

Namely in the present exemplary embodiment, the front side cover 24 is divided into an inside portion 24A on the vehicle width direction inner side, and an outside portion 24B on the seat width direction outer side, and is stitched together at the stitched portion 110 along the height direction of the seatback 14. The stitched portion 110 is positioned further to the seat width direction inner side than the center C of the inflator 46, and also further to the seat width direction inner side than the stitched portion 32 at the frame portion, as viewed along the height direction of the seatback 14. The stitched portion 110 is stitched together using a weaker thread than the thread used to stitch together the stitched portions 30, 32, 34. In the present exemplary embodiment, the weakened portion 72 of the seat pad 18 is formed at a position facing the stitched portion 110.

In the present exemplary embodiment, the stitched portion 110 and the weakened portion 72 rupture under inflation pressure from the side airbag 42, thereby forming an opening such that the side airbag 42 inflates and deploys outside the seatback 14. In the present exemplary embodiment, the stitched portion (rupture portion) 110 is positioned further to the seat width direction inner side than the center C of the inflator 46 as viewed along the height direction of the seatback 14, and further to the seat width direction inner side than the stitched portion 32 at the frame portion, thereby enabling the side airbag 42 to be deployed toward the occupant side, similarly to in the first exemplary embodiment. The present exemplary embodiment is effective in vehicle models in which it is difficult to configure the stitched portion 30 as a rupture portion.

Note that in the third exemplary embodiment, the front side cover 24 is divided into the inside portion 24A and the outside portion 24B, however the inside portion 24A and the outside portion 24B may be partially connected together.

Explanation has been given regarding exemplary embodiments of the present invention, however the scope of rights encompassed by the present invention is not limited to the respective exemplary embodiments described above, and various modifications may be implemented within a range not departing from the spirit of the present invention.

The entire contents of the disclosure of Japanese Patent Application No. 2012-164918 are incorporated by reference in the present specification. All publications, patent applications and technical standards mentioned in the present specification are incorporated by reference in the present specification to the same extent as if the individual publication, patent application, or technical standard was specifically and individually indicated to be incorporated by reference.

The invention claimed is:

1. A side airbag deployment direction control structure comprising:
   an airbag module that is installed inside a vehicle width direction outer side side portion of a seatback at a vehicle width direction outer side of a door-side side frame portion of a seatback frame, that is configured to include a side airbag and an inflator, and that inflates and deploys the side airbag toward a vehicle front side with gas from the inflator when a vehicle side-on collision has been detected or predicted;

a rupture portion that, as viewed along a seatback height direction, is provided at a seat cover closer to a seat width direction inner side than a center of the inflator and closer to the seat width direction inner side than a stitched portion between a front side cover and a side cover of a seat cover of the seatback, and that forms an opening to inflate and deploy the side airbag to outside the seatback by rupturing under inflation pressure from the side airbag; and a reaction force plate installed inside the side portion and fixed at the door-side side frame portion, the reaction force plate being positioned at the vehicle width direction outer side of the airbag module and including a side reaction force face of which a front end portion is disposed closer to the vehicle width direction outer side than the rupture portion, and the front end portion extending closer to the vehicle front side than the airbag module, the door-side side frame portion and the rupture portion.

2. The side airbag deployment direction control structure of claim 1, wherein the rupture portion is a stitched portion between a front cover and the front side cover of the seat cover.

3. The side airbag deployment direction control structure of claim 1, wherein the front end portion of the side reaction force face includes a guide face that is angled or curved so as to approach the vehicle width direction inner side on progression toward the vehicle front side, and the guide face is positioned closer to the vehicle front side than the door-side side frame portion.

4. The side airbag deployment direction control structure of claim 1, wherein:
the side reaction force face is configured by a vehicle width direction inner side face of a vehicle width direction outer side wall of an airbag case that accommodates the side airbag prior to inflation and deployment,
the airbag case includes a bag deployment opening formed at a vehicle width direction inner side portion of a front portion of the airbag case closer to the vehicle front side than the door-side side frame portion, and a door portion which is coupled to a rear end edge of the bag deployment opening through a hinge portion and which closes off the bag deployment opening, and
the side airbag inflates and deploys through the bag deployment opening to outside of the airbag case by the door portion opening toward the vehicle width direction inner side direction under inflation pressure of the side airbag.

5. The side airbag deployment direction control structure of claim 4, wherein the airbag case is made out of resin, deformation suppressing reinforcement portions are spanned between a front wall and the vehicle width direction outer side wall of the airbag case, and between the vehicle width direction outer side wall and a rear wall of the airbag case.

6. The side airbag deployment direction control structure of claim 1, wherein the airbag module and the reaction force plate are fixed at the door-side side frame portion through a bracket, which is fixed at the door-side side frame portion, by a stud bolt, which is provided at a gas generation device that is a constituent member of the airbag module, passing through the bracket and through the reaction force plate and being screwed into a nut.

7. The side airbag deployment direction control structure of claim 4, wherein the airbag module and the airbag case are fixed at the door-side side frame portion through a bracket, which is fixed at the door-side side frame portion, by a stud bolt, which is provided at a gas generation device that is a constituent member of the airbag module, passing through the bracket and through a rear wall of the airbag case and being screwed into a nut.

8. The side airbag deployment direction control structure of claim 6, wherein:
the bracket is configured by an attachment portion which is fixed at the door-side side frame portion and a module fastening portion which extends from the attachment portion toward the vehicle width direction outer side, and the stud bolt passes through the module fastening portion.

9. The side airbag device deployment direction control structure of claim 1, wherein:
a front end face of the airbag module projects out closer to the vehicle front side than the door-side side frame portion.

10. The side airbag device deployment direction control structure of claim 1, wherein:
the reaction force plate includes a fixing wall fixed at the door-side side frame portion through a bracket;
an outside wall extends from a vehicle width direction outer side end portion of the fixing wall toward the vehicle front side; and
the reaction force plate is formed with an L-shaped cross-section profile as viewed along the height direction of the seatback.

11. The side airbag device deployment direction control structure of claim 1, wherein:
the reaction force plate includes a fixing wall fixed at the door-side side frame portion through a bracket, and an inside wall extending from a vehicle width direction inner side end portion of the fixing wall toward the vehicle front side;
an outside wall extends from a vehicle width direction outer side end portion of the fixing wall toward the vehicle front side; and
the reaction force plate is formed with a J-shaped cross-section profile as viewed along the height direction of the seatback.

12. The side airbag device deployment direction control structure of claim 4, wherein:
the bag deployment opening is formed such that: (a) a rear wall of the airbag case projects closer to the vehicle width direction inner side than a front wall of the airbag case and (b) the vehicle width direction outer side wall of the airbag case projects closer to the vehicle front side than a vehicle width direction inner side wall of the airbag case.

* * * * *